UNITED STATES PATENT OFFICE.

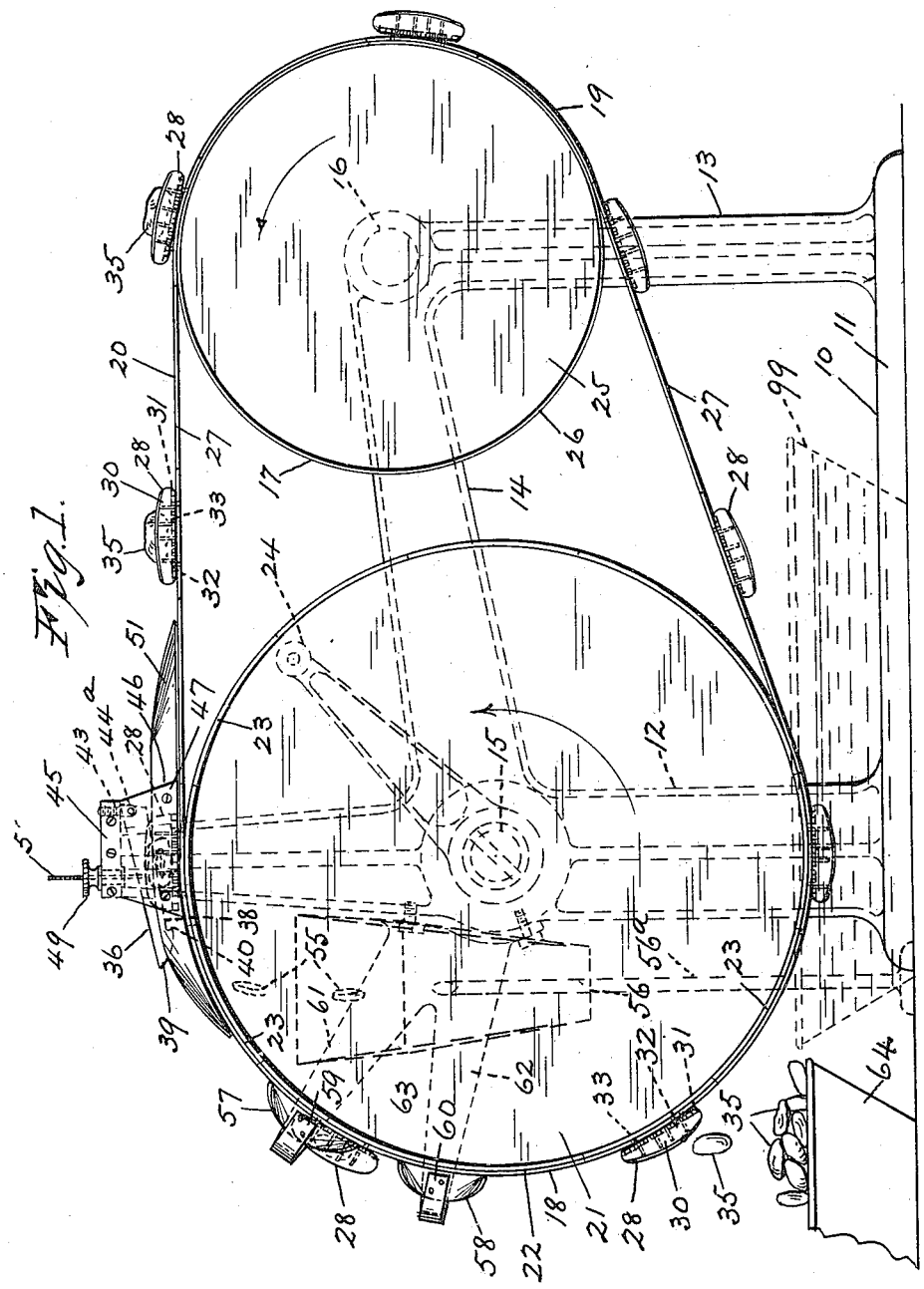

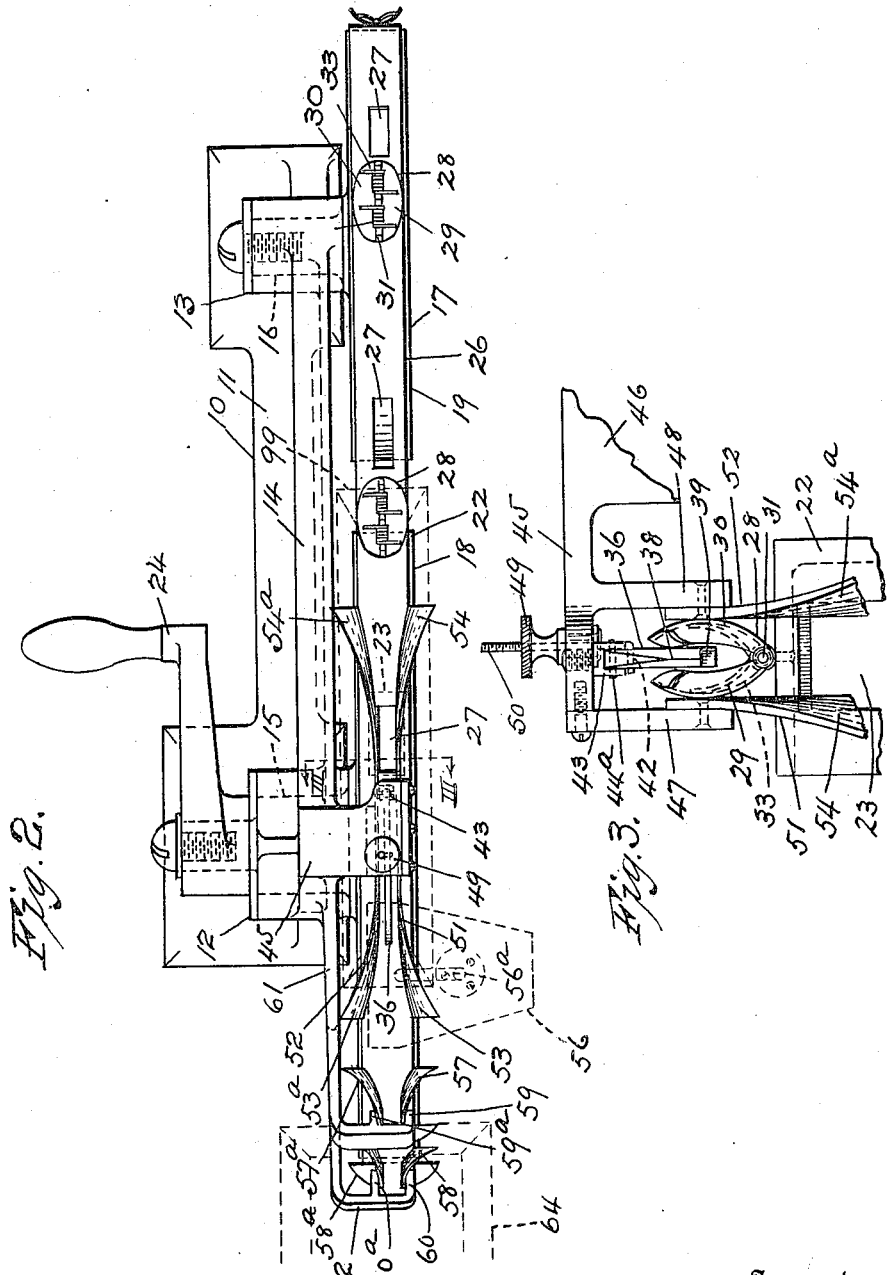

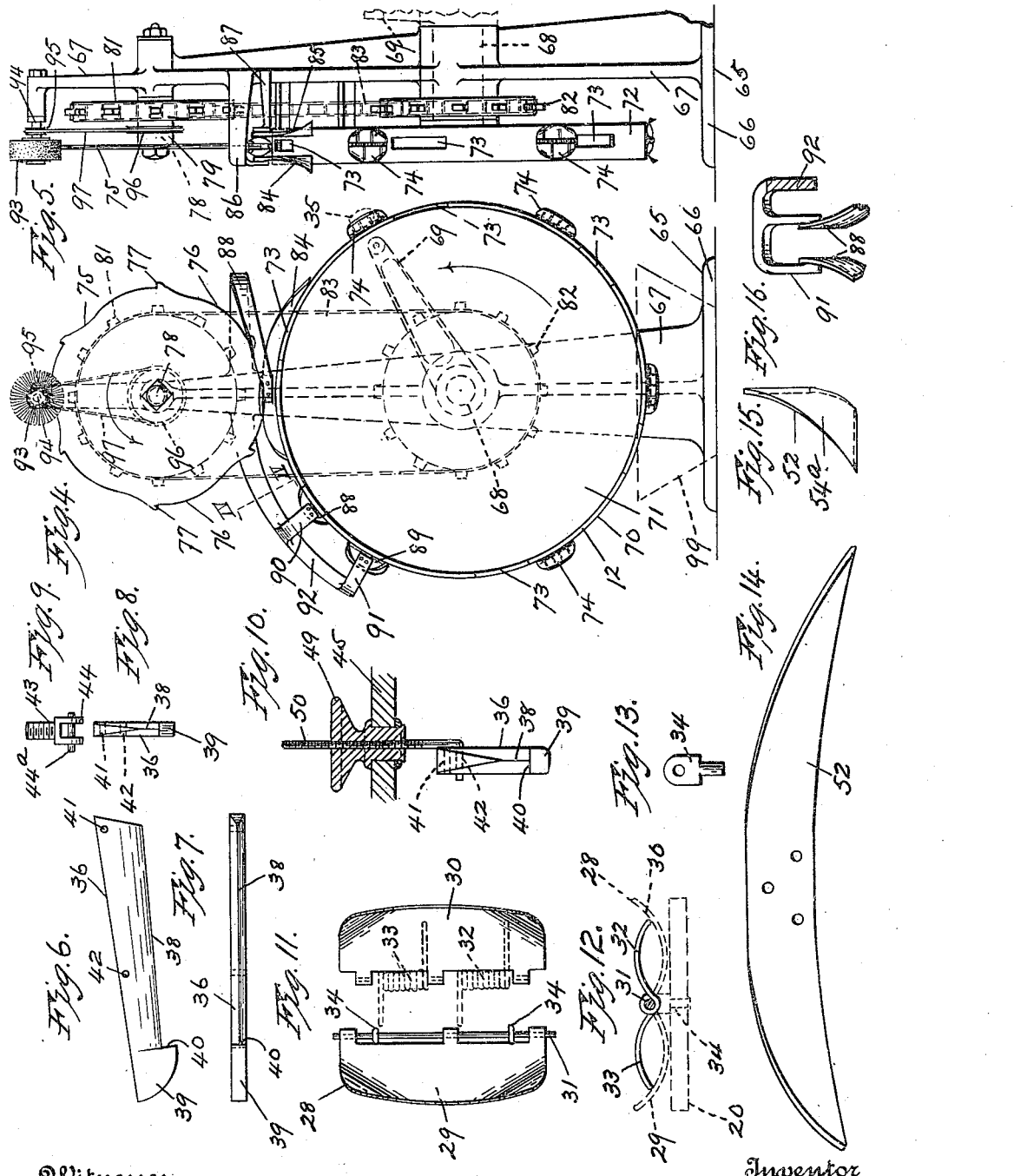

WILLIAM W. MAMEL, SR., OF NEW YORK, N. Y., ASSIGNOR TO GARRETT E. HARING, OF NEW YORK, N. Y.

MACHINE FOR PITTING FRUIT.

1,204,175. Specification of Letters Patent. Patented Nov. 7, 1916.

Application filed March 1, 1915. Serial No. 11,188.

*To all whom it may concern:*

Be it known that I, WILLIAM W. MAMEL, Sr., a citizen of the United States, and a resident of New York, borough of Bronx, county of Bronx, and State of New York, have invented a certain new and useful Improvement in Machines for Pitting Fruit, of which the following is a full, clear, and exact specification.

This invention relates more particularly to a class of machines adapted to be used for preparing fruit for consumption.

My invention has for its object primarily to provide a machine designed to be utilized for removing with facility the pits of fruit, especially dates and prunes, so as to be prepared in various forms for consumption, and which will obviate the requirement of pitting the fruit by hand. This is accomplished mainly by providing a frame on which is mounted a cutter, or blade having one or more knife edges and on the cutter adjacent to each knife edge is provided an extracting member. Also on the frame is mounted a conveyer on which is arranged one or a plurality of carriers for removably holding the fruit to be pitted, and this conveyer is adapted to be circumferentially transmitted for moving the carriers and the fruit so that the fruit will first contact with one of the knife edges of the cutter for being slitted and then for the seed to be engaged by the adjacent extracting member in a manner whereby it will be removed from the fruit.

Other objects of the invention are to provide on the frame means for transmitting the conveyer and the carriers; to provide means for permitting the cutter to be adjusted relatively to the fruit for being properly pitted; and to provide a wiper for clearing the cutter of all meat which may accumulate thereon.

With these and other objects in view the invention will be hereinafter more particularly described with reference to the accompanying drawings forming a part of this specification, in which similar characters of references indicate corresponding parts in all the views, and will then be pointed out in the claims at the end of the description.

In the drawings, Figure 1 is a side elevation of one form of machine for pitting fruit embodying my invention. Fig. 2 is a top plan of the machine. Fig. 3 is an enlarged fragmentary view, showing one end of the cutter and contiguous parts of the machine taken on the line III—III of Fig. 2. Fig. 4 is a side elevation of a somewhat different form of the machine. Fig. 5 is a rear elevation, partly fragmentary, of the machine. Fig. 6 is a side view of the cutter blade used in the machine shown in Fig. 1. Fig. 7 is an inverted view of the cutter blade. Fig. 8 is a view of one end of the cutter blade. Fig. 9 is a view of a pin employed for pivoting one end of the cutter blade to a bracket provided on the frame of the machine. Fig. 10 is an enlarged sectional view, partly in detail, showing the cutter blade and the form of means for adjusting it in the machine. Fig. 11 is an enlarged top plan of one of the carriers used in the machine. Fig. 12 is an end view of one of the springs used in each of the carriers. Fig. 13 is a view of one of the pins used for fastening the carriers to the conveyer. Fig. 14 is an enlarged side view of one of the guide plates employed in the machine for partially closing the carriers at intervals. Fig. 15 is an end view of the guide plate shown in Fig. 14, and Fig. 16 is an enlarged fragmentary view taken on the line IV—IV of Fig. 4.

The machine has a frame 10 formed with a base 11 having two spaced standards 12 and 13 projecting upwardly therefrom, and these standards are connected by a longitudinally disposed bar 14. The standard 12 is of a length so as to extend some distance above the second standard, and centrally of the standard 12 is journaled a drive shaft 15. Also journaled in the standard 13 is a short shaft or stud 16, and these shafts support a conveyer 17 adapted to be transmitted circumferentially.

The conveyer 17 is composed of a wheel 18, a second wheel 19, and over these wheels is guided a belt 20 which may be made of sheet metal, leather, rubber, or the like. The wheel 18 is preferably formed of a circular disk 21 which is held to one end of the drive shaft 15, and around the periphery of this disk is an overhanging rim, or band 22, having a number of spaced openings 23 therethrough. As shown, the wheel 18 is considerably larger in diameter than the wheel 19, and this wheel 18 is driven by rotating its shaft 15 through the medium of a crank handle 24 provided on the other end of the shaft. The wheel 19 is likewise preferably formed of a circular disk 25 held on the shaft 16 of the standard 13 of the frame, and overhanging the peripheral edge of this disk is a rim, or band 26. The wheel 19 is arranged so that its upper edge is on alinement with the upper edge of the wheel 18, and through the belt 20 are a number of apertures 27 which are spaced at intervals so that each aperture will register with one of the openings 23 of the wheel 18 when the belt is driven by the wheels 18 and 19 being rotated by turning the crank handle 24.

In order to removably hold fruit, especially dates and prunes so as to be pitted, at spaced intervals on the belt 20 are provided a plurality of carriers, as 28, all of which are preferably alike in formation. Each of the carriers 28 has two complemental substantially rectangular leaf members, or wings 29 and 30 which are correspondingly concaved lengthwise thereof, and these concaved wings of each carrier are hinged together by a rod 31 so that the concavities will be in opposed relation when closed together. The rod 31 of each carrier is encircled by one or two spiral springs 32 and 33. Both of the springs 32 and 33 are formed with their end portions disposed in opposite lateral directions from the spring proper so that one of the corresponding ends of the springs will extend transversely of the inner surface of the wing 29 while the second corresponding end of the springs will extend transversely of the inner surface of the wing 30 of each carrier, and the free end portions of each pair of the springs are convexly curved with respect to the concavities of the wings. The springs of each of the carriers thereby normally serve to yieldingly force the complemental concaved wings thereof in opposite directions to open positions, as shown in Fig. 12, to allow a date, or a prune, or other fruit to be easily fed and rest therein, the convex ends of the springs also serving to hold the fruit in each carrier against accidental displacement. The carriers 28 are arranged lengthwise on the exterior surface of the belt 20 so that the rear ends of the wings of each carrier will be adjacent to the forward end of each of the apertures 27 of the belt, and each carrier is secured to the belt by one or more pins, or eyes 34, Figs. 11, 12, 13, engaging the rod 31 of each carrier as well as engaging the belt.

When the machine is operated by the crank handle, as above explained, the belt 20 and the carriers 28 will be caused to travel over the wheel 19 toward and over the wheel 18, and as each carrier passes from the top of the wheel 19 toward the wheel 18 a single date, as 35, is fed into each carrier so as to be disposed lengthwise on the convex ends of the springs between each pair of the wings 29 and 30. Serving to slit and remove the pit from the date, an adjustable cutter, or blade as 36 Figs. 1, 2, 3, 6, 7, 8, 10, is provided. The cutter 36 or blade has the greater part of its lower longitudinal edge knife-sharpened, as at 38, and projecting from the forward end of the cutter downwardly from its sharpened edge is a head 39 having a straight edge adjacent to the sharpened edge to provide a shoulder, or extracting member 40. Through the upper end of the cutter 36 opposite to its head 39 is a hole 41, and through the central part of the cutter at its upper edge is another hole 42. The cutter 36 is pivoted by a threaded bolt 43 having an apertured pronged head, as 44, straddling the upper edge of the blade, and through the apertures of the bolt head as well as through the hole 41 of the cutter is passed a pin 44ª. The threaded end of the bolt 43 is screwed into a threaded opening in the transverse plate 45 of a bracket, as 46, projecting from the top of the standard 12 of the frame of the machine so as to overhang the wheel 18 and the belt 20, and depending from the transverse plate 45 of this bracket are two spaced vertical arms 47 and 48 disposed so that the apertures 27 of the belt and the openings 23 of the rim of the wheel 18 will register with the space therebetween during the travel of the belt and the driving of this wheel. The arms 47 and 48 of the bracket 46 are also spaced sufficiently apart from the carriers 28 to pass between them. As shown, the cutter 36 is pivotally disposed midway between the arms 47 and 48 of this bracket, and as the end of the cutter opposite to its extracting member, or shoulder 40 is pivoted to the bracket the cutter is so positioned that its shouldered end may be adjusted in upwardly and downwardly directions to and from the carriers 28 as well as being disposed in the path of movement of the carriers for its cutting edge 38 to be first contacted by the date in each carrier when transmitted between the depending arms of the bracket, and then for its seed or pit to be removed by engaging the extracting member 40. In order to permit the cutter 36 to be adjusted in this manner for properly slitting and pitting the fruit, in an opening in the transverse plate 45 of the bracket 46 is a freely revoluble thumb-nut 49 having a vertically disposed threaded passage therethrough in which is screwed a threaded rod 50 extending into the space between the arms 47 and 48 of the bracket 46, and the lower end of this rod is angularly bent and disposed through the hole 42 of the cutter 36. By rotating the thumb-nut 49 accordingly the threaded rod 50 will be directed downwardly and in turn the cutter 36 will also be downwardly moved on its pivot for being adjusted relatively to the carriers 28 so as to slit and remove the pit from the fruit, and by reversely rotating the thumb-nut the blade may be suitably adjusted in an upwardly direction.

As hereinbefore explained, the springs 32 and 33 of each of the carriers 28 normally tend to yieldingly hold the wings 29 and 30 of each carrier in an open position on the belt 20, and to cause the wings of each carrier to be swung toward each other against the tension of the springs whereby the carrier may be partially closed to allow the fruit therein to be held for being slitted and pitted by the cutter 36, on the inner surface of the end of the arm 47 of the bracket 46 of the cutter 36 is secured the central part of a guide plate 51, and on the opposed surface of the end of the arm 48 of the bracket is secured the central part of a similar guide plate 52. The guide plates 51 and 52 may be of any desired lengths, and both of these guide plates are disposed longitudinally of and slightly above the belt 20 so that the carriers 28 will pass therebetween when transmitted. One of the corresponding ends of the guide plates 51 and 52 are outwardly flared, as at 53 and 53ª, and the other corresponding ends of these plates are likewise outwardly flared, as at 54 and 54ª. When the machine is in operation and the fruit has been fed into the carrier traveling toward and next to the cutter the wings of this carrier will engage the flared ends 54 and 54ª of the guide plates 51 and 52 as the carrier is admitted therebetween. The wings of the carrier as it enters between the plates will then be caused by the guide plates to be swung upwardly against the tension of the springs 32 and 33 thereof to a partially closed position so that the convexed ends of the springs will clamp the fruit therebetween, and as the carrier with the fruit are farther transmitted between the guide plates the wings of the carrier will pass along the sides of the cutter 36 for its cutting edge to first slit the fruit and then for its pit to contact with the extracting member 40 of the cutter. The seed, or pit of the fruit will thereby be forced therefrom, and the pit, as 55, will then pass from the rear of the carrier through the adjacent registered aperture 27 and the opening 23 of the belt and the wheel 18, respectively, for delivery into a refuse chute, as 56, provided on the disk 21 of the wheel 18 so as to extend some distance laterally therefrom. When the carrier and the pitted fruit have passed the cutter 36 the tension of the springs of the carrier will force its wings to be spread apart against the flared ends 53 and 53ª of the guide plates for allowing the carrier to be gradually opened.

As the meat of dates particularly is of a sticky character the tendency of this class of fruit when being pitted by the machine will be to adhere to the springs of the carriers, and to cause the fruit to separate therefrom after being pitted, each carrier is transmitted between one or a number of pairs of spaced guide strips, as 57, 57ª and 58, 58ª Figs. 1 and 2. These guide strips are similarly formed, and the strips of each pair are held to and between two spaced fingers 59, 59ª and 60, 60ª of two spaced arms 61 and 62 of a bracket 63 extending laterally from the standard 12 of the frame of the machine so that the guides will be close to the belt 20 after passing the cutter 36. One of the corresponding ends of each pair of the guide strips is flared, and these flared ends are in opposed relation to the flared ends 53 and 53ª of the guide plates 51 and 52. After each of the carriers 28 with the pitted fruit has been transmitted between the guide plates 51 and 52 and the wings of the carrier have swung open, as explained, each carrier will be successively transmitted between each pair of the guide strips 57, 57ª and 58, 58ª. The first pair of these guides will cause the wings of the carrier to be partially closed together and the springs thereof will then swing the wings open. The second pair of the guides will again cause the wings to be likewise partially closed, and when swung open again after passing through the second pair of guide strips the fruit will be entirely separated from the carrier so as to drop therefrom into a suitable receptacle, as 64, which may be conveniently placed to receive the pitted fruit.

Figs. 4 and 5 illustrate a somewhat different form of the machine for pitting fruit. This machine has a frame 65 constructed with a base, as 66, and extending upwardly from this base is a standard 67. In the central part of the standard 67 is journaled a longitudinally disposed shaft 68 on one end of which is a crank handle 69 for permitting the shaft to be manually revolved, and on the other end of this shaft is a conveyer 70. The conveyer 70 is preferably in the form of a wheel formed of a circular disk 71 which is fixed to the shaft, and on the peripheral edge of the disk is an overhanging rim 72. The rim 72 may be made of sheet metal or any other desired material, and at spaced intervals through the overhanging rim are a plurality of openings, as 73. The conveyer 70 is adapted to be revolved preferably from right to left, as indicated by the arrow, when the shaft 68 is rotated by turning the crank handle 69 also from right to left.

On the outer surface of the rim 72 are a number of spaced carriers 74. The carriers 74 are similar in formation to the carriers 28 of the machine shown in Fig. 1 for holding and transmitting fruit in a like manner to be pitted, and each of the carriers 74 may be arranged and held by any desired means on the rim 72 so that the rear end of each carrier will be adjacent to the forward end of each of the openings 73. When the conveyer 70 is revolved the carriers 74 will be transmitted circumferentially, and serving to slit and remove the pit of the date, prune, or like fruit which may be fed and yieldingly held therein, as hereinbefore explained, a revoluble cutter, as 75, is provided.

The cutter 75 is in the form of a circular blade having spaced parts of its peripheral edge sharpened to a knife-edge, as at 76, and extending from spaced parts of the periphery of the cutter are a number of extracting members, as 77, which are in the forms of lugs each having a part thereof angularly cut-away to form a straight shoulder at one end of each of the knife-edges 76. The cutter or blade 75 is held on one end of a shaft 78 journaled in the standard 67 for the cutting-edges 76 and the extracting members, or shoulders 77 of the cutter when revolved to move in a path somewhat above the conveyer 70 corresponding to the lengthwise center of its rim 72 so as to revolubly move between the wings of each of the carriers 74 when transmitted. The cutter 75 is adapted to be revolved from right to left like the conveyer 70, and this is accomplished by providing on the shaft 78 between the cutter and the standard 67 a freely rotatable sleeve 79 which is keyed to the cutter. On the sleeve 79 is a sprocket wheel 81, and on the shaft 68 of the conveyer is another sprocket wheel 82. Over the sprocket wheels 81 and 82 is guided a sprocket chain 83 so that when the conveyer is rotated this sprocket chain will also rotate the sprocket wheel 81, the sleeve 79, and the cutter 75. By properly proportioning the diameters of the sprocket wheels 81 and 82 the cutter will be revolved relatively to the speed of the conveyer for one of the knife-edges 76 to slit the fruit and for the next adjacent extracting member 77 to remove the pit from the fruit when each carrier is transmitted under the cutter, the pit then falling through the next adjacent opening 73 of the rim of the conveyer.

The wings of the carriers 74, like the wings of the carriers 28 of the machine shown in Fig. 1, are normally swung to open positions on the rim of the conveyer 70 to permit the fruit to be fed therein, and to cause the wings of each carrier to be yieldingly swung toward each other against the tension of their springs for partially closing the carrier to permit the fruit to be slitted and pitted by the cutter 75, two guide plates 84 and 85 are arranged longitudinally and slightly above the rim of the conveyer. The guide plates 84 and 85 are similar in formation to the guide plates 51 and 52, and the guide plates 84 and 85 are spaced apart so that the carriers 74 will pass therebetween when transmitted as well as allowing the cutter 75 to revolve between them. The guide plate 84 is held against movement by being secured to the end of a bar, as 86, projecting from the standard 67 of the frame 65, and also from this standard extends a second bar, as 87, to which the guide plate 85 is fastened. When the machine is in operation and the fruit has been fed into the carrier traveling toward and next to the cutter 75 the wings of the carrier as it is admitted between the plates 84 and 85 will be caused by the engagement with the plates to be swung upwardly against the tension of the springs thereof to partially closed positions, and when the carrier has passed from between these guide plates the tension of its springs will swing its wings open. The carriers are then successively opened and closed for permitting the fruit to automatically separate therefrom by being transmitted through two spaced pairs of guide strips 88 and 89, both pairs of which are similarly formed to the guide strips 57, 57ª and 58, 58ª of the machine shown in Fig. 1. The pairs of guide strips 88 and 89 are disposed in close proximity to the rim of the conveyer 70 in consecutive spaced relation to the guide plates 84 and 85 so that when a carrier with its fruit has been transmitted through the guide plates the wings of the carriers will be successively opened and closed by passing through the pairs of strips in the manner hereinbefore explained relatively to the operation of the like parts of the machine illustrated in Fig. 1, and the fruit will then tend to automatically drop from the carrier. The guide strips 88 and 89 are held against movement by being respectively fixed to the spaced fingers of two spaced similar prongs, as 90 and 91, projecting laterally from a bar, as 92, which extends from the standard 69.

To clear the cutter of all meat of the fruit which may accumulate thereon, a wiper, as 93, is provided. The wiper 93 is preferably in the form of a circular rotatable brush held on one end of a shaft 94 which is journaled in a bearing on the standard 67 above the cutter 75. The brush 93 is arranged so that the cutting-edges and the extracting members of the cutter 75 are disposed between the free ends of the bristles of the brush, and this brush is revolved preferably in the same direction as the direction of rotation of the cutter in unison with the operation of the machine, but in such a manner as to cause the peripheries to oppose each other in direction of movement at their points of engagement. In order to revolve the brush 93 on its shaft 94 is a pulley 95, and on the sleeve 79 of the shaft 78 of the cutter 75 is a second pulley 96.

Over the pulleys 95 and 96 is guided a belt 97 so that when the sleeve 79 is revolved by the operation of the machine, as heretofore explained, the pulley 96 will likewise be rotated, and the belt 97 will be driven to rotate the pulley 95, the shaft 94, and the brush 93 which in turn will clear the cutter 75 of all the meat of the fruit which may collect thereon when the machine is in operation. To also clear the containers of any meat of the fruit which may collect thereon, under the machine shown in Fig. 1 as well as under the machine shown in Fig. 4 may be a suitable receptacle, as 99, containing water, or other cleaning liquid. The receptacle 99 is arranged so that the carriers of either machine when operated will pass through the cleaning liquid after the pitted fruit from each carrier has been separated therefrom, and in this manner the carriers may be kept clean and clear of all matter from the fruit.

In the foregoing description, I have embodied the preferred form of my invention, but I do not wish to be understood as limiting myself thereto, as I am aware that modifications may be made therein without departing from the principle, or sacrificing any of the advantages of this invention, therefore I reserve to myself the right to make such changes as fairly fall within the scope of the appended claims.

Having thus described my invention, I claim as new and desire to secure by Letters Patent:—

1. In a machine for pitting fruit, a frame, a cutter mounted on the frame, having a knife-edge for slitting the fruit, an extracting member on the cutter for engaging the pit to remove it from the fruit, a carrier adapted to removably hold the fruit and having a plurality of spaced openings therethrough, a movable conveyer supporting the carrier so as to be transmitted for the cutter to engage the fruit in the carrier, said conveyer having openings alining with the openings of the carrier during the operation thereof, means on the frame adapted to be operated for transmitting the conveyer whereby the fruit in the carrier will first be slitted by the cutter and its pit will then be engaged by the extracting member so as to be removed from the fruit and discharged through the openings, and means for contacting with the cutter to permit any meat of the fruit collected on the cutter to be removed therefrom.

2. In a machine for pitting fruit, a frame, a cutter mounted on the frame, having a knife-edge for slitting the fruit, an extracting member on the cutter for engaging the pit to remove it from the fruit, a plurality of carriers adapted to removably hold the fruit and having a rim provided with a plurality of spaced openings therethrough, a movable conveyer supporting all the carriers so as to be transmitted for the fruit in each carrier to be successively engaged by the cutter, said conveyer having openings alining with the openings of the carrier during the operation thereof, means on the frame adapted to be operated for transmitting the conveyer whereby the fruit in each carrier will first be slitted by the cutter and its pit will be engaged by the extracting member so as to be removed from the fruit, and means beneath the carriers and conveyer for dipping the carriers during their movement for removing the matter collected thereon.

3. In a machine for pitting fruit, a frame, a cutter mounted on the frame, having a knife-edge for slitting the fruit, an extracting member on the cutter for engaging the pit to remove it from the fruit, a spring carrier adapted to removably hold the fruit and means for moving the same into gripping position, means on the frame, supporting the carrier, said means being operable for transmitting the carrier whereby the fruit will be first slitted by the cutter and its pit will then be engaged by the extracting member so as to be removed from the fruit, and means on the frame, connected to the cutter to permit the cutter to be adjusted vertically relative to the carrier so that the fruit may be properly slitted and pitted, substantially as described.

4. In a machine for pitting fruit, a frame, a cutter mounted on the frame, having a knife-edge for slitting the fruit, an extracting member on the cutter for engaging the pit to remove it from the fruit, a plurality of carriers adapted to removably hold the fruit, means on the frame, supporting the carriers, and including a conveyer having a plurality of openings therein, said means being operable for transmitting the carriers in succession whereby the fruit in each carrier will first be slitted by the cutter and the pit of each fruit will then be engaged by the extracting member so as to be removed from the fruit, and discharged through the openings, a receptacle supported at one side of the machine in receiving position relative to the openings for the discharge of the pits therein, and means on the frame, connected to the cutter to permit the cutter to be adjusted relatively to the carrier so that the fruit may be properly slitted and pitted, substantially as set forth.

5. In a machine for pitting fruit, a frame, a cutting blade mounted on the frame and having a straight knife-edge for slitting the fruit, means for pivotally supporting the blade, said blade having a projecting shoulder forming an extracting member for the pits, to remove the latter, a plurality of carriers adapted to removably hold the fruit and comprising hinged members, a circumferentially movable conveyer supporting all the carriers so as to be transmitted for the fruit of each carrier to be successively engaged by the cutters, means for supporting the conveyer, said means being operable for transmitting the conveyer whereby the fruit of each carrier will first be slitted by the knife edge of the cutter and the pit of the fruit will then be engaged by the extracting member to remove the pit from the fruit, means for normally spreading the hinged members of the carriers, means for moving the same into clamping position during the cutting operation and means to move said hinged members into clamping engagement at spaced intervals after the cutting operation and to release the same for permitting the discharge of the pitted fruit.

This specification signed and witnessed this twenty seventh day of February A. D. 1915.

WILLIAM W. MAMEL, Sr.

Witnesses:
ROBT. B. ABBOTT,
M. DERMODY.

Copies of this patent may be obtained for five cents each, by addressing the "Commissioner of Patents, Washington, D. C."